United States Patent Office 2,997,503
Patented Aug. 22, 1961

2,997,503
PROCESS OF PREPARING SUBSTITUTED TETRAHYDRONAPHTHALENES
Marion S. Carpenter, Nutley, William M. Easter, Jr., Hasbrouck Heights, and Thomas F. Wood, Little Falls, N.J., assignors to The Givaudan Corporation, New York, N.Y., a corporation of New Jersey
No Drawing. Filed Jan. 28, 1955, Ser. No. 484,836
1 Claim. (Cl. 260—592)

This invention relates to a novel musk material and to a process for preparing it.

Most of the known synthetic musk-like compounds fall into two classes: (1) nitrated aromatic hydrocarbons, such as musk xylene, and (2) macrocyclic ketones, lactones or esters, such as cyclopentadecanone, cyclopentadecanolide and ethylene brassylate. While members in the first group are inexpensive to manufacture, they suffer from the disadvantage that they are not light-stable or alkali-stable, frequently causing discoloration in products such as soap. Members of the second group, while reasonably stable to light and alkalies, are difficult to manufacture and are relatively costly.

We have found that acetyl, hexamethyl-1,2,3,4 tetrahydronaphthalene has the desirable property of being musk-line in olfactory character and yet is extremely stable to light and to alkalies, and, at the same time, is inexpensive to manufacture.

In general, our novel musk material is prepared by reacting p-cymene and 4-methyl-2,4-pentanediol in the presence of sulfuric acid and then acetylating the resulting condensation product.

It will be readily apparent that our novel musk-like compound can be employed in widely-varying formulations, depending upon the type of formulation, the odor effect desired, the desires of the compounder of the formulation, etc. Consequently, we do not wish to confine ourselves to any particular formulation, but wish it to be understood that our product can be employed as musks in perfume-containing formulations in general. By the term "perfume-containing" we include, inter alia, perfumes, cosmetics, soaps.

The following example illustrates the practice of our invention.

EXAMPLE

*Preparation of 7-acetyl-1,1,2,4,4,6-hexamethyl-1,2,3,4-tetrahydronaphthalene*

Into a cold mixture (−5° C.) of p-cymene, 720 g., and 1,800 g. of sulfuric acid, 93%, was added with stirring 236 g. of 2-methyl pentane-2,4-diol (2 mols.) over a 2 hr. period while maintaining the temperature at −5 to 5° C. After being stirred 2 hrs. longer at 0 to 5° C., the mixture was quenched on 1,800 g. of crushed ice. The oil layer was separated and washed with 10% caustic soda solution and then with water until neutral. Upon vacuum distillation there was obtained, after recovery of excess p-cymene (535 g., B.P. 44–50° C. at 3 mm.) a fraction, B.P. 84–85° C. (1.5 mm.) amounting to 114 g., $n_D^{20}$ 1.5040–1.5070 (yield=26.4% of theory).

*Analysis.*—Calc'd. for $C_{16}H_{24}$: C, 88.85; H, 11.10. Found: C, 88.80; H, 11.06.

Upon nitration of the hydrocarbon there was obtained a dinitro derivative which when recrystallized from #30 alcohol was obtained as pale yellow crystals, M.P. 82.2–83° C. having a musk-like odor.

*Analysis.*—Calc'd for $C_{16}H_{22}N_2O_4$: C, 62.7; H, 7.19; N, 9.15. Found: C, 62.64; H, 7.35; N, 9.03.

A solution of 108 g. of the foregoing fraction of B.P. 84–85° C. (1.5 mm.) (0.5 mol.) and 45 g. of acetyl chloride (0.573 mol.) was added during the course of 1 hour to a suspension of 77 g. of aluminum chloride in 270 g. of ethylene dichloride, the mixture being stirred at 20–25° C. during the reaction. Then the temperature was increased to 40° C. and stirring was continued for 30 minutes. The batch was quenched on 500 g. of cracked ice. The oil layer was separated and washed neutral with water. The ethylene dichloride was distilled off and the residual oil was vacuum-distilled, yielding 106 g. of material, B.P. 121–129° C. (1 mm.), $n_D^{20}$ 1.5260, consisting of a viscous yellow liquid having a musk-like odor.

The resulting oil consists substantially of 7-acetyl-1,1,2,4,4,6-hexamethyl-1,2,3,4-tetrahydronaphthalene with probably a small amount of the isomer: 7-acetyl-1,1,2,2,4,6-hexamethyl-1,2,3,4-tetrahydronaphthalene.

The foregoing illustrates the practice of this invention, which, however, is not to be limited thereby but is to be construed as broadly as permissible in view of the prior art and limited solely by the appended claim.

We claim:

The process for preparing a mixture comprising substantially all 7-acetyl-1,1,2,4,4,6-hexamethyl-1,2,3,4,-tetrahydronaphthalene and a small amount of 7-acetyl-1,1,2,2,4,6 - hexamethyl - 1,2,3,4 - tetrahydronaphthalene, which comprises condensing p-cymene and 4-methyl-2,4-pentanediol in the presence of sulfuric acid, and acetylating the resulting condensation product.

References Cited in the file of this patent

UNITED STATES PATENTS 2,588,123   Kern _____ Mar. 4, 1952

OTHER REFERENCES

Bruson et al.: J.A.C.S., volume 62, pages 37–44 (1940).
Hoffmann-La Roche, 42, C.A. 7339 (1948).